United States Patent [19]

Smith

[11] Patent Number: 4,935,724

[45] Date of Patent: Jun. 19, 1990

[54] EAS TAG WITH MAGNETICALLY STRUCTURED CONTROL ELEMENT

[75] Inventor: Andrew L. Smith, Hedgerley, England

[73] Assignee: Thorn EMI plc, London, England

[21] Appl. No.: 385,861

[22] Filed: Jul. 27, 1989

[30] Foreign Application Priority Data

Jul. 27, 1988 [GB] United Kingdom ............... 8817855

[51] Int. Cl.$^5$ .............................................. G08B 13/24
[52] U.S. Cl. ..................................... 340/551; 340/572
[58] Field of Search ............................... 340/551, 572

[56] References Cited

U.S. PATENT DOCUMENTS

| | | | |
|---|---|---|---|
| 4,568,921 | 2/1986 | Pokalsky | 340/551 |
| 4,752,758 | 6/1988 | Heltemes | 340/572 |
| 4,857,891 | 8/1989 | Heltemes | 340/551 |

Primary Examiner—Glen R. Swann, III

Attorney, Agent, or Firm—Fleit, Jacobson, Cohn, Price, Holman & Stern

[57] ABSTRACT

A tag 2 for use in an electronic article surveillance system comprises a magnetically structured component 4 in close proximity to a striplike element 6 of magnetically soft material. The component 4 includes magnetic particles 8 orientated into particular directions in regions 10, 12, preferably at ±45° relative to the longitudinal axis of the tag.

The tag 2 can be deactivated by longitudinal wiping with a deactivator providing a magnetic field corresponding to the angle of orientation of the particles 8. Deactivation is, therefore, straightforward for a check out operator but not for a potential thief.

The orientated particles 8 can be used to define an interpretable code enabling product inventory with deactivation.

7 Claims, 3 Drawing Sheets

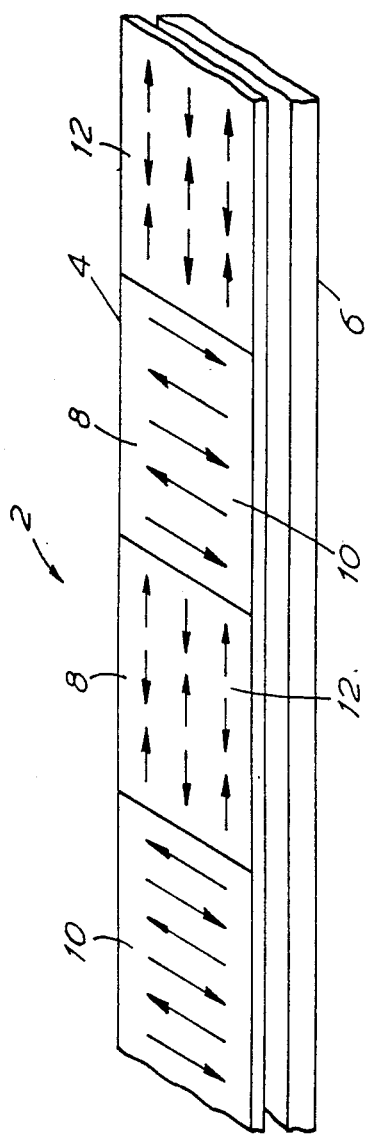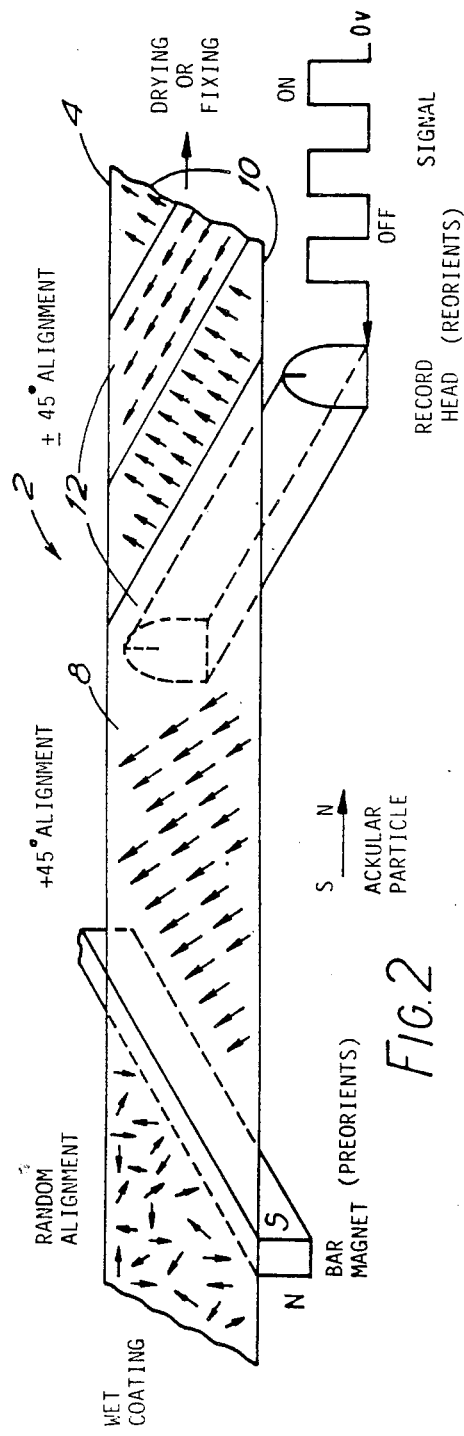

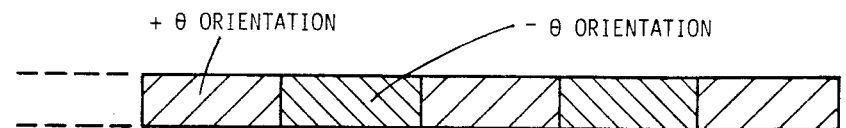
FIG.4(a) FABRICATION
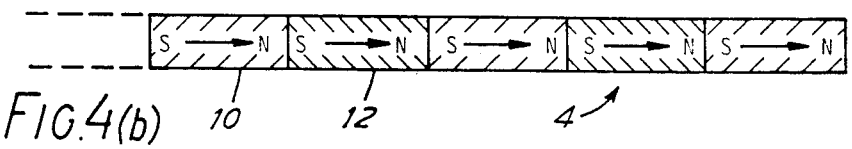
FIG.4(b) ACTIVATION
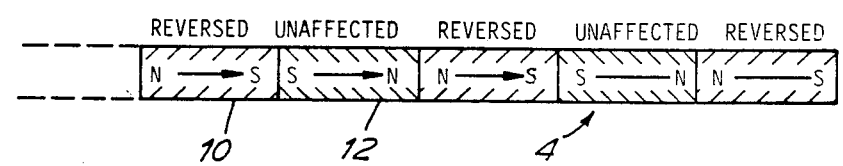
FIG.4(c) DEACTIVATION
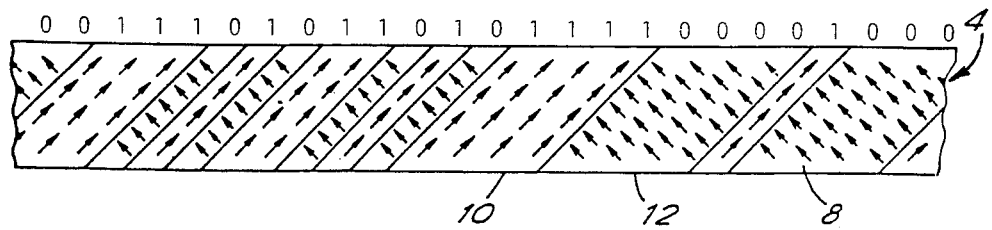
FIG.5

EAS TAG WITH MAGNETICALLY STRUCTURED CONTROL ELEMENT

BACKGROUND OF THE INVENTION

This invention relates to electromagnetic tagging apparatus and in particular to magnetic tags for use with electromagnetic identification systems of the kind which can be employed, for example, in electronic article surveillance (E.A.S.), primarily for in-store sucurity, or in access control.

Such systems, in either environment, utilise an element, frequently referred to a "tag", which influences an electromagnetic field, so causing a disturbance in a characteristic of the field as detected by a detector device. The tag needs to exhibit a number of characteristics one of which, especially relevant for in-store usage, is the capability of being readily de-activated by check-out personnel whilst being difficult for a would-be thief to de-activate.

It is usual for the element, or tag, to contain a strip of highly permeable magnetic material. Such material is easily influenced by a relatively weak interrogating field and caused to generate a number of harmonic frequencies which are readily detected by a suitable detection device. Unless it is proposed to physically fracture or mechanically strain the strip in order to de-activate it, and such activities would place severe limitations upon the form which a tage could take, de-activation is usually achieved by magnetising hard material disposed in the tag and configured so as to produce, when so magnetised, a series of poles along the length of the strip of highly permeable material. This series of lpoles alters the magnetic "profile" of the tag, as presented to the interrogating field, and inhibits th generation of the aforementioned harmonics, thus permitting the detection device to distinguish between activated and de-activated tags.

It has been usual hitherto for the magnetically hard material used for de-activation of the tag to be provided either in the form of discontinuous lengths arranged in close proximity to the strip of magnetically soft material, or in continuous lengths similarly disposed. In the first case, de-activation is relatively straightforward for check-out personnel to accomplish, but the same can be said for would-be thieves. In the second case, more care has to be taken by the check-out personnel because the continuous length of magnetically hard material has to be selectively magnetised to produce a pole pattern sufficient to change the electromagnetic profile of the tag, but at the same time de-activation is made more difficult for the would-be thief.

SUMMARY OF THE INVENTION

The present invention seeks to provide an improved tag which can be deactivated easily by check out or access security personnel but for which deactivation is difficult for potential thieves or intruders.

This invention is predicated upon the incorporation into the security tag of a magnetically structured component. Such components are well-known in the art as being "magnetically watermarked" and are described, for example, in British Patent No. 1,331,604.

Accordingly, there is provided a tag for use in an electromagnetic identification system comprising an element of magnetically soft material and, in sufficiently close magnetic communnication therewith for permitting local magnetic polarisation of the element, a magnetically structured component comprising, in a first region thereof, magnetic particles having their magnetic axes orientated in a first direction, and in a further region thereof, magnetic particles having their magnetic axes not generally orientated in any direction or orientated in a further direction.

Preferably, the magnetic particles in the first region are orientated at an angle of substantially 90° with respect to the axes of the magnetic particles in the further region.

Advantageously, the magnetically structured component is of strip form and the magnetic axes of the magnetic particles in the first and further regions are orientated at an angle of substantially 45° to the longitudinal axis of the strip.

In a further embodiment, the magnetic particles in the first and further regions are arranged to define an interpretable code.

BRIEF DESCRIPTION OF THE DRAWINGS

The present invention will now be described, by way of example, with reference to the accompanying drawings in which, FIG. 1 is a schematic representation of a tag in accordance with the present invention;

FIG. 2 is a schematic representation of a magnetically structured component for use in the tag illustrated in FIG. 1 and showing a preferred orientation of the magnetic particles;

FIGS. 4a to 4c show schematic plan views of the magnetically structured component in activated and deactivated states and having the magnetic particles orientated at ±45° to the longitudinal axis of the component; and FIG. 5 is a schematic representation of the magnetically structured component with the magnetic particles configured to define an interpretable code.

DESCRIPTION OF THE PREFERRED EMBODIMENTS

Figure 3A:
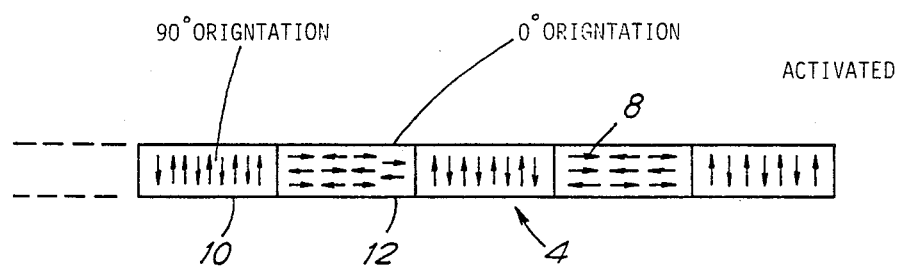
FIGS. 3a to 3c show schematic plan views of the magnetically structured component in activated and deactivated states and having the magnetic particles orientated at 0° and 90° to the longitudinal axis of the component.

Referring to FIG. 1, a tag 2 comprises a magnetically structured component 4 and an element 6 of magnetically soft material. The component 4, which preferably is in the form of a strip, is arranged in sufficiently close proximity to the element 6 to permit the component 4, when magnetised, to create in the magnetically soft element 6 a pole pattern sufficient to inhibit generation of the aforementioned harmonies when the tag 2 is subjected to an interrogating field. As shown in FIG. 1, the component 4 is arranged to overlie the magnetically soft element 6. However, the tag 2 may equally be fabricated with the element 6 overlying the structured component 4.

The magnetically structured component 4 comprises a circular magnetic particles 8 dispersed in a binder and orientated into particular directions in respective regions 10, 12, or orientated in some regions and randomly orientated in other regions, as shown in FIG. 2 which also illustrates, schematically, how the particles may be so orientated during fabrication of the compoent 4.

The method of manufacturing the component 4 will not be described in the context of this application as it will be assumed to be known to those skilled in this art.

Figure 3B:
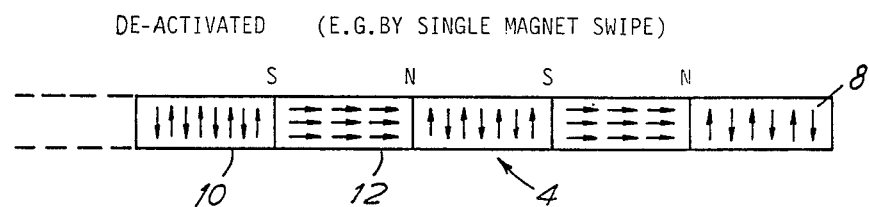
Figure 3C:
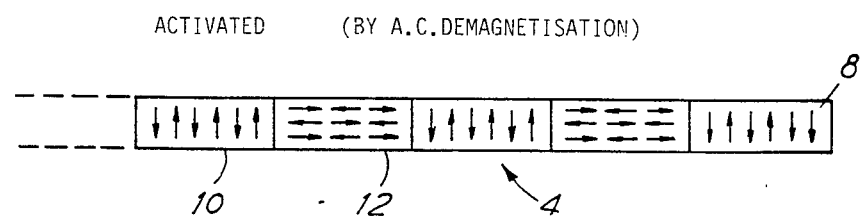

In the embodiment shown in FIG. 3 the tag 2, when activated, has the magnetic particles 8 orientated at 0° and 90° with respect to the longitudinal axis of the component 4 and also, therefore, of the tag 2 in which the component 4 is embodied. In this activated condition, no pole pattern is induced in the element 6 and hence, the element 6 may be sensed when subjected to an interrogating field of, for example, an electronic article surveillance system. When the component 4 is magnetised, however, such as by a single swipe with a magnet along the longitudinal axis of the component, the magnetic particles having 0° orientations with respect to this axis are aligned to form a pole pattern within the component which, in view of the proximity to the element 6, creates a pole pattern within the element 6, as shown in FIG. 3b. In this condition the tag 2 is deactivated as the magnetically soft element 6 cannot be detected by the interrogating field. The tag 2 can be reactivated readily by subjecting the component 4 to an a.c. magnetic field, thereby negating the pole pattern in the component 4, and hence also the pole pattern in the element 6, as shown in FIG. 3c, once again enabling the element 6 to be detected by the interrogating field.

It is particularly advantageous to arrange for the magnetic particles 8 in the selected regions 10, 12 of the component 4 to be orientated in a direction other than longitudinall of the strip. For example, the magnetic particles 8 may be orientated at 45° to the longitudinal axis, as fabricated, shown in FIG. 4a. In this embodiment, the tag 2 is activated by a magnetic swipe along the longitudinal axis of the magnetically structured component 4, causing a pole pattern in the component 4 as shown in FIG. 4b and enabling the element 6 to be detected by an interrogating field.

The tag 2 may be deactivated by "developing" the component 4 by means of a specially constructed deactivator, designed to be swiped along the longitudinal axis of the strip but to generate a developing magnetic field at an angle corresponding to the angle of orientation of the magnetic particles 8 in the regions 10, 12, i.e. at 45° in the embodiment shown in FIG. 4a.

This magnetic swipe causes a reversal of a selection of the magnetic pole patterns in regions 10, 12 of the component 4 (alternate regions in the embodiment shown in FIG. 4a) to provide a magnetic pole pattern in the component 4 as shown in FIG. 4c. This pole pattern, having like magnetic poles adjacent to each other, induces a pole pattern in the magnetically soft element 6 sufficient to prevent detection of the tag when subjected to an interrogating field. This deactivation of the tag by an appropriately aligned magnetic field renders deactivation simple for a check out operator, but not for the would-be thief who, even if aware of the need for an off-set between the developing field and the direction of swipe would not be aware of the correct angle, which could be changed for different stores and/or batches of product.

The magnetically structured component 4 can be used to contain coded information if desired, as shown in FIG. 5 and, if the coding is matched to various products, of product categories, it is possible for product inventory to be monitored by providing suitable detection and analysis circuitry at the de-activation point and linking such circuitry to the store's central computer.

In any of the above magnetic particle configurations the tag can, of course, be re-activated by de-magnetising the magnetically structured component.

It has been determined that the thickness required for the magnetically structured component to produce an average longitudinal de-activation field of 10 Oe and on the basis of the component bein in strip-like form of width 8 mm and with alternate regions of length 2 mm being oriented in a chosen direction, with intervening regions either being not orientated or orientated perpendicularly to the first-mentioned regions, is 30–35 microns. This thickness is also dependent on using a magnetically soft element 6 in strip-like form, of about the same width as the structured component 4. For an element of magnetically soft material 0.026 mm thick, 1 mm wide and 60 mm long, the required thickness of the magnetically structured component 4 would be approximately 125 microns.

Although the present invention has been described with respect to specific embodiments, it should be realised that modifications may be effected within the scope of the invention. For example, magnetic particle orientations at 0° and 90° or ±45° have been described. However, magnetic particle orientations at other angles may equally be adopted, although it is preferable to maintain an angle in the region of 90° between the orientation of the particles in the respective elements. Furthermore, the magnetic particles are shown in the embodiments as lying flat within the magnetically structured component. It should be realised, however, that the magnetic axes of the magnetic particles, by suitable known fabrication techniques, can be arranged to stand in an upright condition, either at an angle of about 90° or at an inclined angle, within the magnetically structured component and the present invention is intended to cover also tags incorporating such upright magnetic particle configurations.

I claim:

1. A tag for use in an electromagnetic identification system comprising an element of magnetically soft material and, in sufficiently close magnetic communication therewith for permitting local magnetic polarisation of the element, a magnetically structured component comprising, in a first region thereof, magnetic particles having their magnetic axes orientated in a first direction, and in a further region thereof, magnetic particles having their magnetic axes not generally orientated in any direction or orientated in a further direction.

2. A tag according to claim 1 wherein the axes of the magnetic particles in the first region are orientated at an angle of substantially 90° with respect to the axes of the magnetic particles in the further region.

3. A tag according to claim 1 wherein the magnetically structured component is of strip form and the magnetic axes of the magnetic particles in the first and or further regions are orientated in a direction other than longitudinally of the strip.

4. A tag according to claim 3 wherein the magnetic axes of the magnetic particles in the first and or further regions are orientated at an angle of substantially 45° to the longitudinal axis of the strip.

5. A tag according to claim 1 wherein the magnetic particles in the first and or further regions are arranged to define an interpretable code.

6. A tag according to claim 1 wherein the magnetically structured component is arranged to overlie the element of magnetically soft material.

7. A tag according to claim 1 wherein the magnetic particles comprise acicular particles.

* * * * *